United States Patent
Pihlaja

(10) Patent No.: US 8,009,146 B2
(45) Date of Patent: Aug. 30, 2011

(54) METHOD, APPARATUS AND COMPUTER PROGRAM PRODUCT FOR FACILITATING DATA ENTRY VIA A TOUCHSCREEN

(75) Inventor: Pekka Pihlaja, Helsinki (FI)

(73) Assignee: Nokia Corporation, Espoo (FI)

( * ) Notice: Subject to any disclaimer, the term of this patent is extended or adjusted under 35 U.S.C. 154(b) by 876 days.

(21) Appl. No.: 11/770,283

(22) Filed: Jun. 28, 2007

(65) Prior Publication Data
US 2009/0002326 A1   Jan. 1, 2009

(51) Int. Cl.
*G06F 3/041* (2006.01)
*G06F 3/048* (2006.01)
*G09G 5/00* (2006.01)

(52) U.S. Cl. ........ 345/173; 345/652; 345/661; 345/684; 715/256; 715/780; 715/784; 715/785; 715/787; 715/856; 715/857; 715/858

(58) Field of Classification Search .................. 345/173, 345/652, 661, 684; 715/256, 780, 784–787, 715/856–858
See application file for complete search history.

(56) References Cited

U.S. PATENT DOCUMENTS

| | | | |
|---|---|---|---|
| 5,565,888 A | 10/1996 | Selker | |
| 6,073,036 A | 6/2000 | Heikkinen et al. | |
| 6,181,325 B1 | 1/2001 | Lee | |
| 6,211,856 B1 | 4/2001 | Choi et al. | |
| 6,278,443 B1 * | 8/2001 | Amro et al. | 345/173 |
| 6,411,283 B1 | 6/2002 | Murphy | |
| 7,023,428 B2 | 4/2006 | Pihlaja | |
| 7,489,306 B2 * | 2/2009 | Kolmykov-Zotov et al. | 345/173 |
| 2002/0030699 A1 | 3/2002 | Van Ee | |
| 2002/0067347 A1 * | 6/2002 | Maezawa et al. | 345/173 |
| 2002/0122029 A1 * | 9/2002 | Murphy | 345/173 |
| 2006/0244735 A1 | 11/2006 | Wilson | |
| 2007/0260981 A1 * | 11/2007 | Kim et al. | 715/531 |

OTHER PUBLICATIONS

Technology Review, Precision Pointing With Fat Fingers, Retrieved Jun. 28, 2007 from Internet Site http://www.technologyreview.com/printer_friendly_article.aspx?id=18770, pp. 1-2.
YouTube—LG Prada Interface—Organizer; LG Prada Phone Model KE850, released 2006, Retrieved Jun. 29, 2007 from Internet Site http://www.youtube.com/watch?v=Ca1LdNrnlEM, pp. 1-2.
Vogel et al., Shift: A Technique for Operating Pen-Based Interfaces Using Touch, Apr. 28-May 3, 2007, pp. 657-666, Association for Computing Machinery, US.

(Continued)

*Primary Examiner* — Kevin M Nguyen
*Assistant Examiner* — Jonathan Boyd
(74) *Attorney, Agent, or Firm* — Alston & Bird LLP

(57) ABSTRACT

A method, apparatus and computer program product are provided for facilitating data entry into an electronic device via a touchscreen. As a user places his or her finger on the touchscreen, a cursor may be displayed at a location relative to other items displayed on the touchscreen that is proximate the physical location where the user touched the touchscreen. Because the cursor is likely now obscured by the user's finger, the items displayed on the touchscreen, including the cursor, may then be shifted or scrolled so that the cursor is offset from the physical location where the user touched the touchscreen. At the same time, the items displayed on the touchscreen may be magnified in order to further facilitate data entry. At this point, the user may shift or tilt his or her finger in order to achieve the desired cursor placement.

34 Claims, 6 Drawing Sheets

OTHER PUBLICATIONS

International Search Report from PCT/IB2008/001306 dated Sep. 26, 2008.

Examiner's Report for corresponding Australian application No. 2008269464 dated Oct. 18, 2010.

* cited by examiner

METHOD, APPARATUS AND COMPUTER PROGRAM PRODUCT FOR FACILITATING DATA ENTRY VIA A TOUCHSCREEN

FIELD

Exemplary embodiments of the invention relate, generally, to electronic device touchscreens and, in particular, to a technique for facilitating the input of data into the electronic device via the touchscreen.

BACKGROUND

As technology improves, electronic devices, such as cellular telephones, personal digital assistants (PDAs), pagers, and the like, appear to get smaller and smaller. With this decrease in size almost necessarily comes a decrease in the size of the display screens of those devices. At the same time, another advance in technology has been the use of these display screens as input devices for their corresponding electronic device. The display screens of many electronic devices are touch sensitive input devices, or touchscreens. However, because the display screens appear to be getting smaller over time, use of the display screen as a touch sensitive input device has become somewhat difficult. This is particularly true where it is intended that an individual use his or her finger to select a selectable item displayed on the touchscreen. As a user places his or her finger on a small item displayed on the touchscreen, the finger will likely occlude the item completely, as well as overlap some of the adjacent items displayed. Consequently, it is difficult if not impossible for the user to be certain which item he or she is selecting.

Several solutions have been proposed for facilitating data entry into relatively small touch sensitive input devices, or touchscreens. Each of these solutions, however, has at least one drawback. One solution is to dynamically magnify a selectable item on the touchscreen when the cursor, or other means of selecting the item, is within a certain proximity to the selectable item. According to this solution, a window displaying a magnified version of a selectable item opens directly on top of the selectable item when the cursor comes within proximity to the selectable item. As the cursor moves closer to the selectable item, the window size and magnification of the selectable item increase until the cursor reaches the magnified window. One drawback of this solution is that it may be difficult to implement where selectable items were scattered throughout a touchscreen, rather than in a single row or column. In particular, where the item the user wishes to select is surrounded by other selectable items, as the cursor moves closer to the intended item, one of the surrounding items would likely become magnified, thereby potentially making it difficult, if not impossible, to see and select the intended item.

Another solution, which may solve the above drawback to the first solution, is to only open the window displaying the magnified version of the selectable item when the user actuates a button. This solution, however, requires additional steps and may further make operating the electronic device to input data a two-handed operation, which is less than ideal. A third solution that has been proposed is to continuously display a window including a magnified view of what is under the window. In this solution, the window has edges that may not be well defined, wherein the magnification decreases smoothly at the margins of the window. According to this solution, however, the magnified window moves with the cursor and may cause the magnified view to appear unstable, restless and wobbly. This solution, therefore, would not facilitate data entry into the touchscreen.

In addition to the foregoing, each of the above solutions may have a further drawback in that the window displaying a magnified version of the selectable item appears directly on top of the selectable item. Where, for example, an individual is using his or her finger, and most commonly his or her thumb (e.g., where the individual is operating the electronic device with one hand) to select the item on the touchscreen, the magnification, and consequently the window, would have to be fairly large in order to make the selected item viewable from under the individual's finger. Given the above-referenced limited size of the display screen, having a large magnification window may be undesirable and may in fact be unfeasible in some circumstances. In addition, even if the magnification window is large enough to be viewable underneath the individual's finger, at least part of the selectable item may still be occluded at all times.

Further proposed solutions for facilitating data entry into relatively small touch sensitive input devices, or touchscreens that address the above drawback are to offset a magnified or unmagnified window above, below, to the left or to the right of the selectable item. Where magnified, this solution, as well as the above solutions, may have the additional drawback that magnifying parts of a graphical user interface generally requires vector graphics, which are not always available on electronic devices, such as cellular telephones; thus potentially causing these solutions to not be possible in some instances.

In addition, if the contents of the original view are magnified in the window, the amplitude of finger movements, including tremor, may be magnified as well. For example, if the contents of the window are magnified to twice their size (i.e., 2× magnification), any finger movement may cause the window contents to move with twice the speed. This may make the view in the window appear restless and hard to control. This problem could be solved by retaining the "gain" of movement (i.e., window content movement/finger movement) as a one-to-one ratio even if the view magnification is two-to-one. Unfortunately, this may create a new problem when the user needs to select (i.e., "paint") a string of characters. In particular, in this situation, by the time the finger reaches the end of the string, the window and the pointer may only be halfway along the string. In other words, the finger and the pointer may no longer be pointing at the same item.

In addition, use of an offset window may have further drawbacks, whether the contents are magnified or not. In particular, as noted above, the size of the touchscreen may be rather small. As a result, there may not be sufficient room on the touchscreen to display an additional window in which items are displayed large enough to provide an improvement over the original display. In addition, the contents of the original touchscreen display are not obscured not only by the user's finger, but also the offset window. As you increase the size of the offset window to further facilitate data entry, the more you obscure the original touchscreen display.

Yet another solution proposed has been to provide a set of crosshairs just above the position where the user places his or her finger, which the user can use to aim. Several drawbacks may exist for this solution as well. In particular, one drawback may be that it forces the user to guess to some extent where to place his or her finger in order to select a certain item on the touchscreen, since he or she can no longer simply touch the screen at the location of that item. In addition, it may be very difficult to place a cursor or select an item at a location near one of the edges of the touchscreen.

A need, therefore, exists for a technique for facilitating data entry into a relatively small touch sensitive input device or touchscreen that overcomes at least the above-described drawbacks.

BRIEF SUMMARY

In general, exemplary embodiments of the present invention provide an improvement by, among other things, providing a method for facilitating data entry into an electronic device via a touch sensitive input device or touchscreen, wherein the items displayed on the touchscreen are automatically shifted or scrolled when the user touches the touchscreen, so that the user can more easily view the exact position where he or she is placing a cursor on the touchscreen. In particular, according to one exemplary embodiment a user touches the touchscreen at a physical location on the touchscreen. Upon detection of this input or contact, a cursor may be displayed on the touchscreen at a location relative to items displayed on the touchscreen (e.g., icons, text, etc.) that is proximate the physical location where the user touched the touchscreen. In other words, where the user uses his or her finger to touch the touchscreen, the cursor may be displayed directly underneath the user's finger. Because the cursor, as well as various items displayed on the touchscreen, are likely now obscured by the user's finger, according to one exemplary embodiment, the items displayed on the touchscreen, including the cursor, may then be automatically shifted or scrolled so that the cursor is now offset from the physical location where the user touched the touchscreen. For example, in one exemplary embodiment all of the items displayed on the touchscreen may be shifted or scrolled upwards. Alternatively, where, for example, the user touches the touchscreen near the top of the screen, the items displayed may be shifted downward and/or to the left or right. At the same time, in one exemplary embodiment, the items displayed on the touchscreen may be magnified in order to further facilitate data entry.

In accordance with one aspect, a method is provided of facilitating data entry via a touch sensitive input device. In one exemplary embodiment, the method may include: (1) detecting a tactile input from a user at a physical location on a touch sensitive input device; (2) displaying a cursor at a relative location on the touch sensitive input device proximate the physical location; and (3) translating, without further user interaction, one or more items displayed on the touch sensitive input device such that the relative location of the cursor is offset from the physical location of the detected tactile input.

In one exemplary embodiment the method may further include determining a distance between the one or more items displayed on the touch sensitive input device. In this exemplary embodiment, the items displayed on the touch sensitive input device may only be translated when the distance is less than a predetermined threshold (e.g., a predefined portion of the width of an average fingertip).

In another exemplary embodiment, the method may further include determining in which vertical half (e.g., top or bottom), horizontal half (e.g., left or right), or quadrant (e.g., top left, top right, bottom left or bottom right) of the touch sensitive input device the physical location falls. In these exemplary embodiments, translating the items displayed on the touch sensitive input device may involve shifting the items upward, downward, left, right, or a combination thereof, depending upon the half or quadrant the physical location falls.

According to another aspect, an apparatus is provided for facilitating data entry via a touch sensitive input device. In one exemplary embodiment, the apparatus includes a processor configured to: (1) detect a tactile input from a user at a physical location on a touch sensitive input device; (2) display a cursor at a relative location on the touch sensitive input device proximate the physical location; and (3) translate, without further user interaction, one or more items displayed on the touch sensitive input device such that the relative location of the cursor is offset from the physical location of the detected tactile input.

In accordance with yet another aspect, a computer program product is provided for facilitating data entry via a touch sensitive input device. The computer program product contains at least one computer-readable storage medium having computer-readable program code portions stored therein. The computer-readable program code portions of one exemplary embodiment include: (1) a first executable portion for detecting a tactile input from a user at a physical location on a touch sensitive input device; (2) a second executable portion for displaying a cursor at a relative location on the touch sensitive input device proximate the physical location; and (3) a third executable portion for translating, without further user interaction, one or more items displayed on the touch sensitive input device such that the relative location of the cursor is offset from the physical location of the detected tactile input.

According to another aspect, apparatus is provided for facilitating data entry via a touch sensitive input device. In one exemplary embodiment the apparatus includes: (1) means for detecting a tactile input from a user at a physical location on a touch sensitive input device; (2) means for displaying a cursor at a relative location on the touch sensitive input device proximate the physical location; and (3) means for translating, without further user interaction, one or more items displayed on the touch sensitive input device such that the relative location of the cursor is offset from the physical location of the detected tactile input.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

Figure 3A:
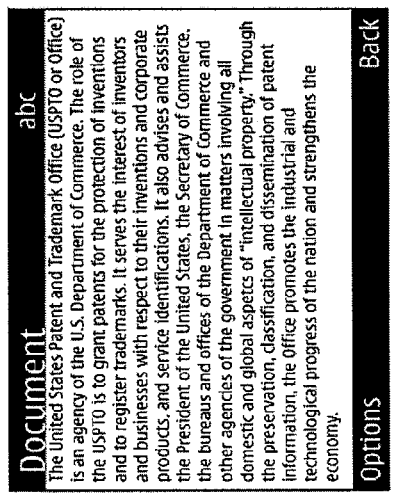
Figure 3B:
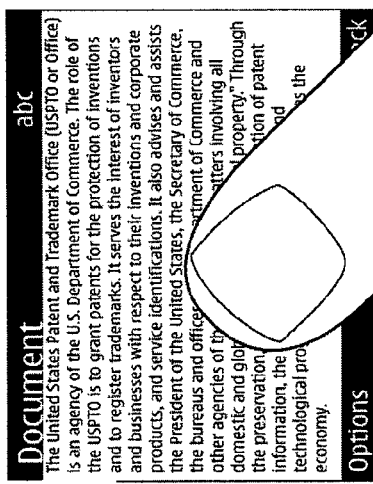
Figure 3C:
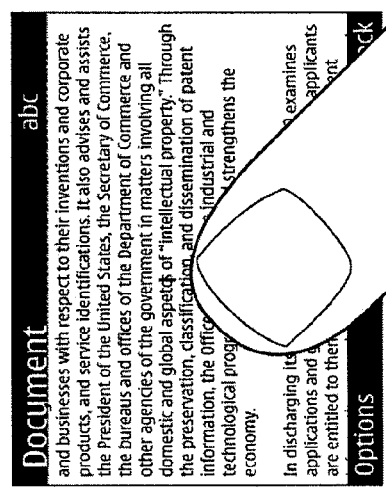
Figure 4C:
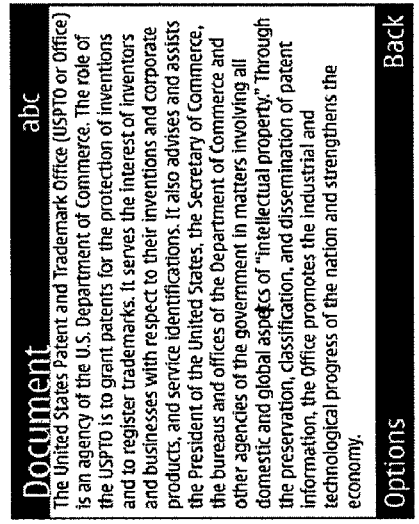
Figure 4B:
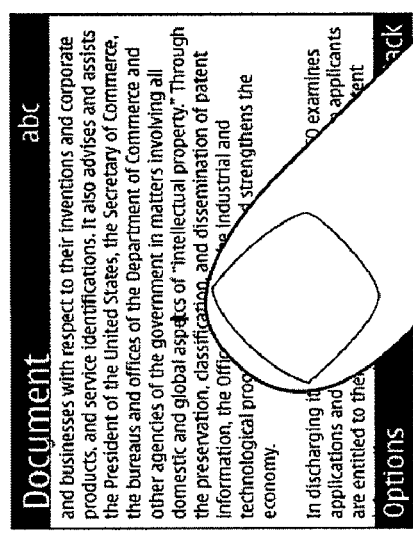
Figure 4A:
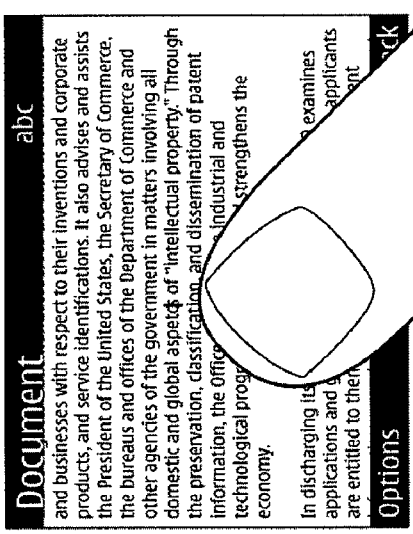
Figure 5B:
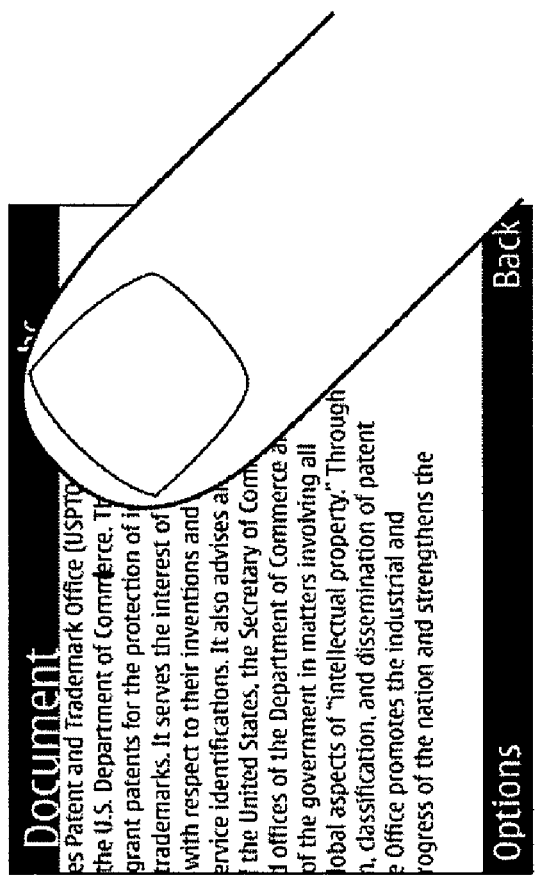
Figure 5A:
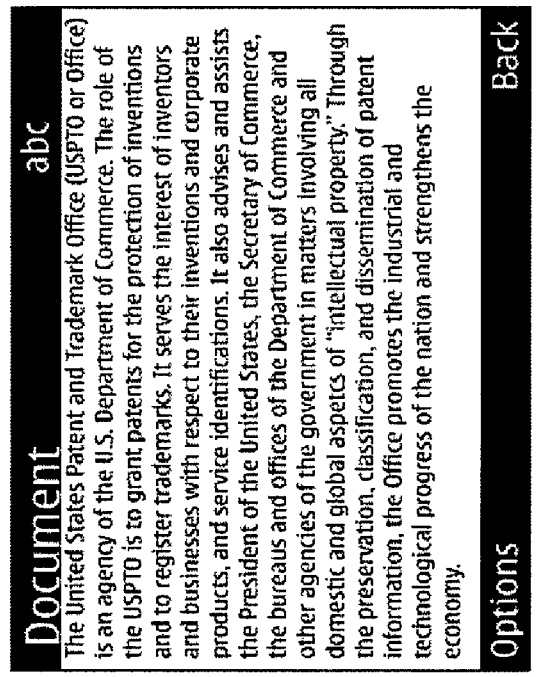
Figure 6B:
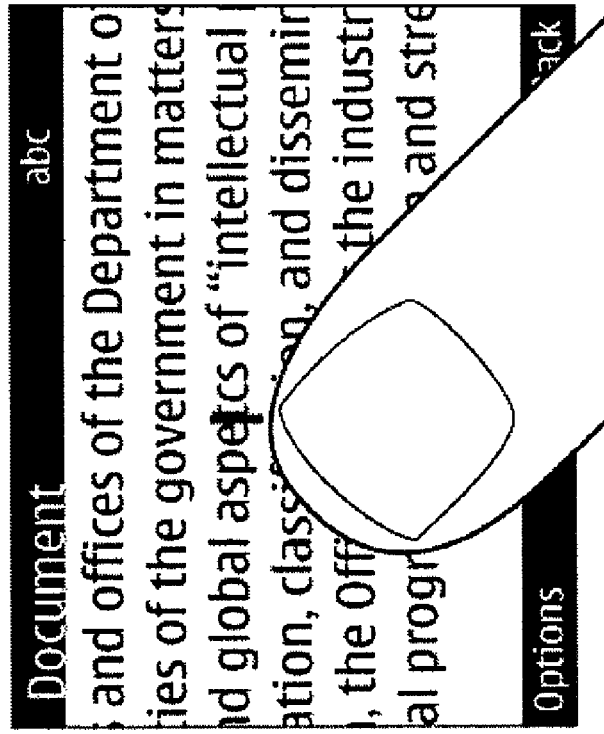
Figure 6A:
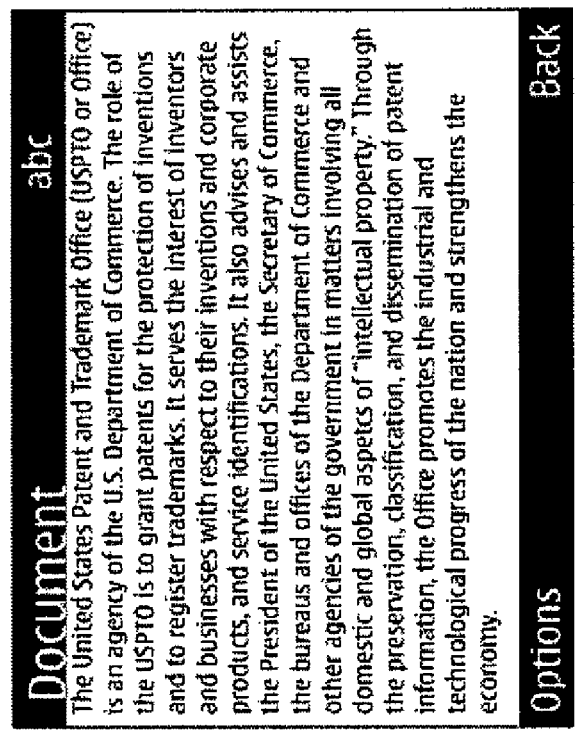

FIGS. 3A-3C provide screen shots of an electronic device touchscreen illustrating the technique for facilitating data entry by scrolling the touchscreen upwards in response to a detected tactile input by a user in accordance with one exemplary embodiment of the present invention;

FIGS. 4A-4C provide additional screen shots of an electronic device touchscreen illustrating the technique for repositioning placement of a cursor on the touchscreen in accordance with another exemplary embodiment of the present invention;

FIGS. 5A and 5B provide screen shots of an electronic device touchscreen illustrating the technique for facilitating data entry by scrolling the touchscreen to the left in response to a detected tactile input by a user in accordance with one exemplary embodiment of the present invention; and FIGS. 6A and 6B provide screen shots of an electronic device touchscreen illustrating the technique for facilitating data entry by scrolling the touchscreen upwards and magnifying the items displayed on the touchscreen in response to a detected tactile input by a user in accordance with yet another exemplary embodiment of the present invention.

DETAILED DESCRIPTION

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, exemplary embodiments of the present invention provide a method, apparatus and computer program product for facilitating data entry into an electronic device via a touch sensitive input device. As noted above, according to one exemplary embodiment, as a user places his or her finger on the touchscreen, a cursor may be displayed on the touchscreen at a location that is relative to other items displayed on the touchscreen and is proximate the physical location where the user touched the touchscreen. Where the items displayed on the touchscreen are close together, the cursor and the item(s) on or within which the cursor is placed are likely now obscured by the user's finger. As a result, according to one exemplary embodiment, the items displayed on the touchscreen, including the cursor, may then be shifted or scrolled in one or more directions so that the cursor, while maintaining its position relative to the other items displayed on the touchscreen, is now offset from the physical location where the user touched the touchscreen.

For example, in one exemplary embodiment all of the items displayed on the touchscreen may be shifted or scrolled upwards. Alternatively, where, for example, the user touches the touchscreen near the top right corner of the touchscreen, the items displayed may be shifted downward and/or to the left. In one exemplary embodiment, the items displayed on the touchscreen may also be magnified in order to further facilitate data entry. At this point, if the user sees that the cursor has not been placed at the location he or she intended, according to one exemplary embodiment, the user may shift his or her finger slightly (e.g., tilt it left, right, up or down) in order reposition the cursor with respect to the other items displayed on the touchscreen.

Figure 1:
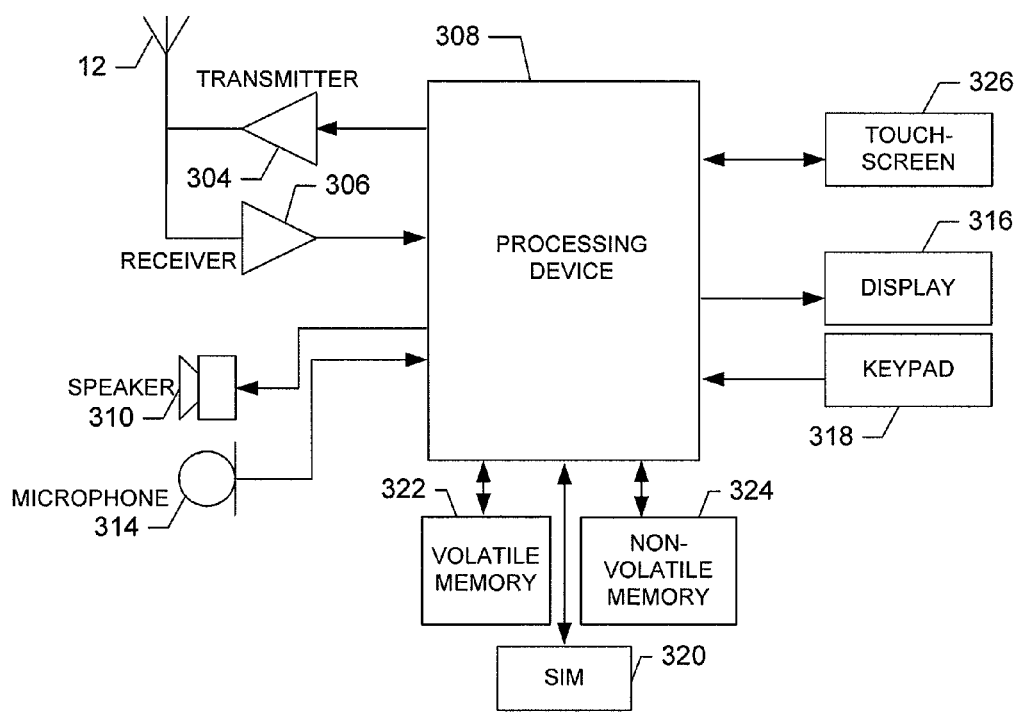
FIG. 1 is a schematic block diagram of a mobile station capable of operating in accordance with an exemplary embodiment of the present invention.

Electronic Device:

Reference is not made to FIG. 1, which illustrates one type of electronic device that would benefit from embodiments of the present invention. As shown, the electronic device may be a mobile station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

Figure 2:
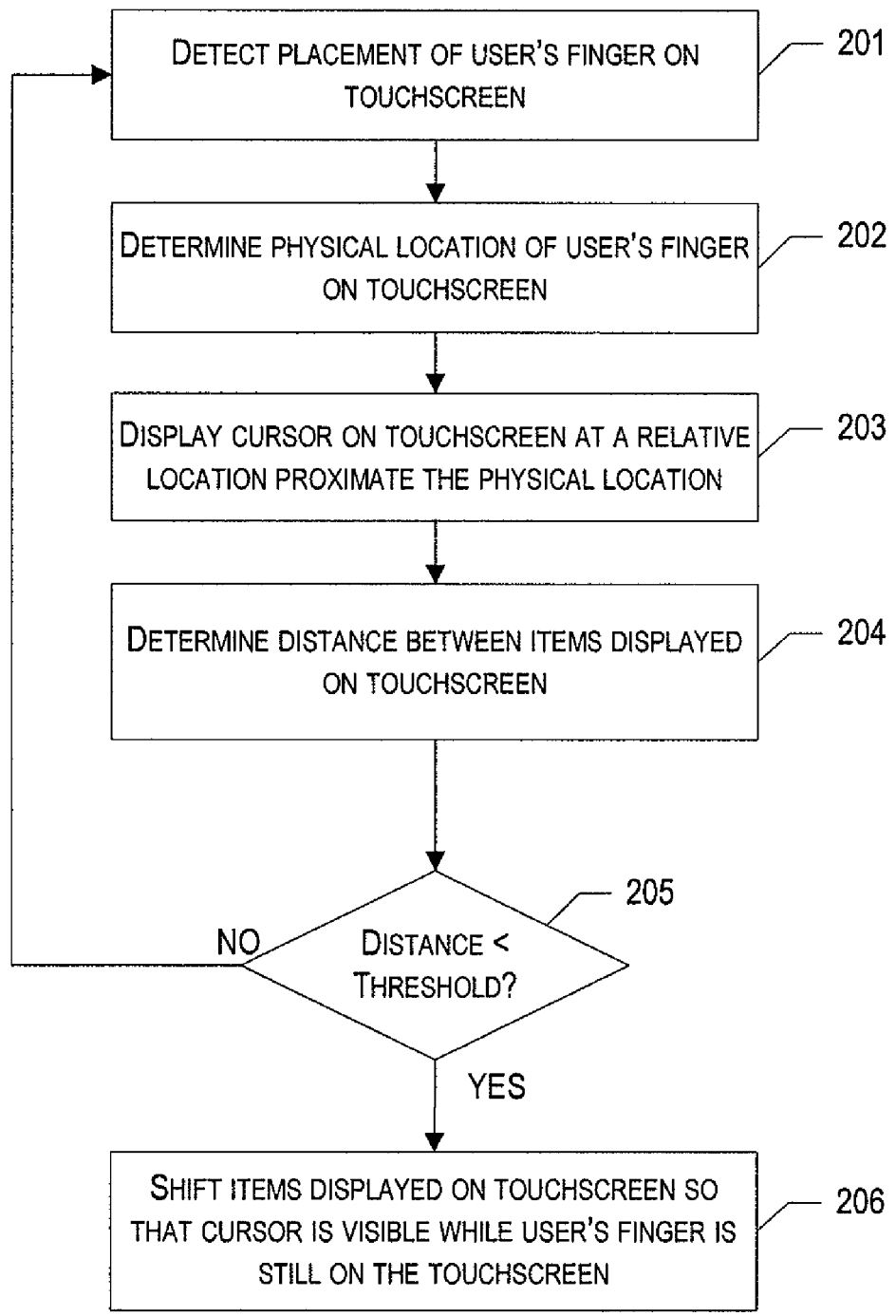
FIG. 2 is a flow chart illustrating the operations which may be taken in order to facilitate data entry into an electronic device via a touch sensitive input device in accordance with exemplary embodiments of the present invention.

The mobile station includes various means for performing one or more functions in accordance with exemplary embodiments of the present invention, including those more particularly shown and described herein, such as a suitably programmed processor. It should be understood, however, that one or more of the entities may include alternative means for performing one or more like functions, without departing from the spirit and scope of the present invention. More particularly, for example, as shown in FIG. 2, in addition to an antenna 302, the mobile station 10 includes a transmitter 304, a receiver 306, and means, such as a processing device 308, e.g., a processor, controller or the like, that provides signals to and receives signals from the transmitter 304 and receiver 306, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, includes the circuitry required for implementing the video, audio, and logic functions of the mobile station and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. The processing device can additionally include an internal voice coder (VC) 308A, and may include an internal data modem (DM) 308B. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 310, a ringer 312, a microphone 314, a display 316, all of which are coupled to the controller 308. The user input interface, which allows the mobile device to receive data, can comprise any of a number of devices allowing the mobile device to receive data, such as a keypad 318, a microphone 314, a touch sensitive display or touchscreen 326, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, as discussed in more detail below, in one embodiment, the memory may store computer program code for detecting a tactile input from a user at a physical location on the touchscreen 326 of the mobile station 10 (e.g., when a user places his or her finger on the touchscreen 326), displaying a cursor at a relative location on the touchscreen 326 proximate the physical location, and translating, without user interaction, one or more items displayed on the touchscreen 326 such that the relative location of the cursor is offset from the physical location of the detected tactile input.

The method, apparatus and computer program product of exemplary embodiments of the present invention are primarily described in conjunction with mobile communications applications. It should be understood, however, that the method, apparatus and computer program product of embodiments of the present invention can be utilized in conjunction with a variety of other applications, both in the mobile communications industries and outside of the mobile communications industries. For example, the method, apparatus and computer program product of exemplary embodiments of the present invention can be utilized in conjunction with wireline and/or wireless network (e.g., Internet) applications.

Method of Facilitating Data Entry Via a Touchscreen

Referring now to FIG. 2, which illustrates the operations which may be taken in accordance with exemplary embodiments of the present invention in order to facilitate data entry into an electronic device via a touch sensitive input device, or touchscreen. As shown, the process may begin when the electronic device and, more typically software executed by a processor of the electronic device, detects a tactile input on the electronic device touchscreen, for example, when a user places his or her finger on the touchscreen (Block 201), and determines the physical location of the tactile input (Block 202). The electronic device may detect the tactile input and determine its location via any number of techniques that are known to those of ordinary skill in the art. For example, the touchscreen may comprise two layers that are held apart by spacers and have an electrical current running therebetween. When a user touches the touchscreen, the two layers may make contact causing a change in the electrical current at the point of contact. The electronic device may note the change of the electrical current (i.e., in order to perform Block 201), as well as the coordinates of the point of contact (i.e., in order to perform Block 202). Alternatively, wherein the touchscreen uses a capacitive, as opposed to a resistive, system to detect tactile input, the touchscreen may comprise a layer storing electrical charge. When a user touches the touchscreen, some of the charge from that layer is transferred to the user causing the charge on the capacitive layer to decrease. Circuits may be located at each corner of the touchscreen that measure the decrease in charge, such that the exact location of the tactile input can be calculated based on the relative differences in charge measured at each corner. Embodiments of the present invention can employ other types of touchscreens, such as a touchscreen that is configured to enable touch recognition by any of resistive, capacitive, infrared, strain gauge, surface wave, optical imaging, dispersive signal technology, acoustic pulse recognition or other techniques, and to then provide signals indicative of the location of the touch.

In one exemplary embodiment determining the physical location of the tactile input may involve not only determining the precise location of the input (e.g., the coordinates of the location), but also determining in which half and/or quadrant of the touchscreen the physical location falls. More specifically, the touchscreen may be divided into verticals halves including a top and a bottom half, horizontal halves including a left and a right half, and/or quadrants including a top left, top right, bottom left and bottom right quadrant, and the physical location of the tactile input may fall within one of these halves and/or quadrants. In one exemplary embodiment, a default position may be held where the user touches the touchscreen directly in between two halves or quadrants. For example, if the touchscreen is divided into vertical halves (i.e., top and bottom halves), the default may be to treat an input detected directly in between the two halves as occurring within the bottom half. Similarly, if the touchscreen is divided into horizontal halves (i.e., left and right), the default may be to treat any input detected directly in between the two halves as occurring within the right half.

Returning to FIG. 2, once the tactile input has been detected and its physical location determined, the electronic device and, more typically software executed by a processor of the electronic device may then display, in Block 203, a cursor on the touchscreen at a location relative to one or more items displayed on the touchscreen (i.e., a "relative location") that is proximate the physical location determined at Block 202. In other words, a cursor may be displayed on the touchscreen at the spot where the user touched the screen. Where, for example, the touchscreen is displaying a text document or message, the cursor will be placed relative to the letters displayed in the text document or message at the spot where the user touched the screen.

The distance between each of the items displayed on the touchscreen may then be calculated or otherwise determined, in Block 204, by the electronic device and, more typically software executed by a processor on the electronic device. The distances may then be compared by the electronic device and, more typically software executed by a processor of the electronic device, to a predetermined threshold that is used to determine whether it is necessary or otherwise desired to shift the contents of the touchscreen so that the user can more easily see where exactly he or she is attempting to place the cursor within the document, or other item(s), displayed on the touchscreen. (Block 205). In particular, if the items are well spaced apart (e.g., spaced more than a predetermined percent, such as ½, the width of an average person's finger, or a predefined amount, such as 2 cm), then it may be obvious to the user where he or she is placing the cursor relative to the items displayed. In contrast, where the items are not well spaced apart (e.g., spaced less than ½ the width of an average person's finger, or 2 cm), then several items (e.g., words and/or letters of a word) may be occluded by the user's finger making it difficult to know where, with respect to those items, the user is placing a cursor. Thus, in Block 205, the electronic device and, more typically software executed by a processor of the electronic device determines whether any of the distances calculated in Block 204 is less than the predetermined threshold (e.g., ½ the width of an average person's finger, or 2 cm). If not, the process may return to Block 201 where a subsequent tactile input, or placement of the user's finger on the touchscreen, may be detected by the touchscreen.

If, on the other hand, at least one of the calculated distances between the various items displayed on the touchscreen is less than the threshold, indicating that several items may be occluded by the user's finger when he or she touches the touchscreen, the process continues to Block 206, wherein the electronic device and, in particular, software executed by the processor operating on the electronic device, shifts the items displayed on the touchscreen (e.g., icons, words of a document, etc.) so that the cursor is visible, at the original location relative to the other items displayed on the touchscreen but offset from the physical location where the user touched the touchscreen. In this way, the cursor may be visible while the user's finger is still placed on the touchscreen.

In exemplary embodiments, shifting the items displayed on the touchscreen may involve scrolling the screen upward, downward, to the left, to the right, or a combination thereof, depending upon the half and/or quadrant the physical location of the detected tactile input falls (as determined at Block 202). For example, if the user's input is detected in the bottom half of the touchscreen, the entire touch screen may "scroll upwards"—i.e., all of the items displayed on the touchscreen may be displaced upwards. Alternatively, where the input is detected in the top left corner of the touchscreen, such that displaying the items upward would not result in the cursor being displayed, the items displayed may be shifted downward and/or to the right. In one exemplary embodiment, a default setting may be established in order to define what should happen when the tactile input is detected directly in the middle of two halves and/or quadrant being measured. For example, as mentioned above, the default may be to interpret placement of the user's finger directly in between the vertical halves as placement in the bottom half and, therefore, to shift the contents of the touchscreen upwards. In yet another exemplary embodiment, the default may be to always scroll or shift the touchscreen upwards unless the user places his or her finger at the extreme top edge of the touchscreen, in which case the contents of the touchscreen may scrolled or shifted downward and/or to the left or right. As one of ordinary skill with recognize, any number of methods of determining in which direction the contents of the touchscreen should be shifted may be used without departing from the spirit and scope of exemplary embodiments of the present invention.

By way of example, FIGS. 3A-3C provides screen shots of a touchscreen of an electronic device illustrating placement of a cursor in a text document in accordance with one exemplary embodiment of the present invention. In particular, FIG. 3A illustrates a touchscreen displaying a text document including the misspelled word "aspetcs," which the user in this exemplary embodiment would like to correct. In order to do so, the user may place his or her finger on the touchscreen, as shown in FIG. 3B, overtop of the position where the misspelled word is displayed. As shown, when the user does so, he or she is no longer able to see the word "aspetcs," or many of the surrounding words, and, therefore, cannot tell whether he or she has placed the cursor on that word, let alone in the right place within that word (e.g., between the "e" and the "t"). In order to facilitate the user's placement of the cursor in the right position, according to one exemplary embodiment shown in FIG. 3C, the entire text document may automatically (i.e., without further user interaction) scroll or shift upwards so that the cursor is no longer obscured by the user's finger. The user is now able to see that he or she has placed a cursor between the "c" and the "s" of the word "aspetcs."

If, at this point, the user is unhappy with the placement of the cursor, for example because he or she would preferred to have had the cursor placed between the "c" and the "t" of the word "aspetcs," according to one exemplary embodiment, the user is able to reposition the cursor as shown in FIGS. 4A-4C. FIG. 4A, which is the same as previous FIG. 3C, again illustrates placement of the cursor in a position relative to the items displayed on the touchscreen (i.e., the words and letters of the text document) that is offset slightly above the physical location where the user touched the touchscreen so that the use can see the placement of the cursor from underneath his or her finger. In order to then move the cursor to the desired position, as shown in FIG. 4B, the user may simply shift or tilt his or finger up, down, right or, as in this example, left, causing the cursor to move in that direction. Once the cursor has been placed at the desired location, the user may then lift his or her finger from the touchscreen, as shown in FIG. 4C, and the cursor will remain at that location relative to the items displayed on the touchscreen, while all of the items displayed (e.g., the text document including the cursor) may return to their original position on the touchscreen (e.g., scroll back down).

While a default setting may be to scroll the contents of the touchscreen upwards to display the cursor, as discussed above, in some instances this may not be possible or ideal because of the placement of the user's finger with respect to the touchscreen. In particular, the touchscreen may be divided into vertical halves (i.e., top and bottom), horizontal halves (i.e., left and right) and/or quadrants (i.e., top left, top right, bottom left and bottom right), and depending upon the half and/or quadrant on which the user places his or her finger, the touchscreen may scroll or shift accordingly. To illustrate, FIGS. 5A and 5B show an example where the user desires to place a cursor within a word that is displayed at the top right corner of the touchscreen (i.e., "Commerce"). In this instance it would not be possible to shift the contents of the touchscreen upward. As a result, as shown in FIG. 5B, the contents of the touchscreen may, instead, be shifted or scrolled to the left causing the cursor and its position with respect to the other words and letters displayed on the touchscreen to now be visible to the left side of the user's finger. A similar scenario may be shown where the user desires to place a cursor on an item displayed on the top left, bottom left or bottom right of the touchscreen.

In another exemplary embodiment, illustrated in FIGS. 6A and 6B, in addition to shifting the items displayed on the touchscreen so that the relative location of the cursor with respect to the items displayed on the touchscreen is offset from the physical location at which the user touched the touchscreen, the contents of the touchscreen may be magnified in order to further facilitate data entry.

Based on the foregoing, exemplary embodiments of the present invention provide a technique for facilitating data entry into an electronic device via a touch sensitive input device, wherein the contents of the touchscreen are shifted or scrolled such that the placement of a cursor with respect to items displayed on the touchscreen is not obscured by the user's finger during placement.

CONCLUSION

As described above and as will be appreciated by one skilled in the art, embodiments of the present invention may be configured as a method and apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. For example, while the various embodiments have been described in conjunction with the use of a user's finger to select an item, other selection devices, such as a stylus, a pencil or the like, may be similarly employed. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   receiving an indication of a tactile input from a user at a physical location on a touch sensitive input device;
   causing display of a cursor at a relative location on the touch sensitive input device proximate the physical location;
   shifting, without further user interaction, the cursor and one or more items displayed on the touch sensitive input device such that the relative location of the cursor is offset from the physical location of the detected tactile input; and
   determining a distance between the one or more items displayed on the touch sensitive input device, wherein the cursor and the one or more items are shifted if at least one distance is less than a predetermined threshold.

2. The method of claim 1, wherein the predetermined threshold comprises a predefined portion of the width of an average fingertip.

3. The method of claim 1 further comprising:
   determining in which vertical half of the touch sensitive input device the physical location falls, wherein shifting the cursor and the one or more items displayed comprises shifting the cursor and the one or more items upward or downward depending upon the determined vertical half.

4. The method of claim 1 further comprising:
   determining in which horizontal half of the touch sensitive input device the physical location falls, wherein shifting the cursor and the one or more items displayed comprises shifting the cursor and the one or more items left or right depending upon the determined horizontal half.

5. The method of claim 1 further comprising:
   determining in which quadrant of the touch sensitive input device the physical location falls, wherein shifting the cursor and the one or more items displayed comprises shifting the cursor and the one or more items upward or downward and left or right depending upon the determined quadrant.

6. The method of claim 1 further comprising:
   magnifying the cursor and the one or more items displayed on the touch sensitive input device.

7. The method of claim 1, wherein shifting the cursor and the one or more items displayed comprises shifting the cursor and the one or more items at least one of downward or to one side, if the physical location of the tactile input is proximate a top edge of the touch sensitive input device, otherwise shifting the cursor and the one or more items displayed comprises shifting the cursor and the one or more items upward.

8. The method of claim 1, wherein a plurality of items are displayed on the touch sensitive input device, and wherein shifting the cursor and the one or more items displayed comprises shifting the cursor and all of the plurality of items at least one of upward, downward, left or right.

9. An apparatus comprising:
   a processor; and
   a memory including computer program code, the memory and the computer program code configured to, with the processor, cause the apparatus to perform at least the following:
   receive an indication of a tactile input from a user at a physical location on a touch sensitive input device;

cause display of a cursor at a relative location on the touch sensitive input device proximate the physical location;

shift, without further user interaction, the cursor and one or more items displayed on the touch sensitive input device such that the relative location of the cursor is offset from the physical location of the detected tactile input; and determine a distance between the one or more items displayed on the touch sensitive input device, wherein the cursor and the one or more items are shifted if at least one distance is less than a predetermined threshold.

10. The apparatus of claim 9, wherein the predetermined threshold comprises a predefined portion of the width of an average fingertip.

11. The apparatus of claim 9, wherein the memory and the computer program code are further configured to, with the at least one processor, cause the apparatus to:

determine in which vertical half of the touch sensitive input device the physical location falls, wherein shifting the cursor and the one or more items displayed comprises shifting the cursor and the one or more items upward or downward depending upon the determined vertical half.

12. The apparatus of claim 9, wherein the memory and the computer program code are further configured to, with the processor, cause the apparatus to:

determine in which horizontal half of the touch sensitive input device the physical location falls, wherein shifting the cursor and the one or more items displayed comprises shifting the cursor and the one or more items left or right depending upon the determined horizontal half.

13. The apparatus of claim 9, wherein the memory and the computer program code are further configured to, with the processor, cause the apparatus to:

determine in which quadrant of the touch sensitive input device the physical location falls, wherein shifting the cursor and the one or more items displayed comprises shifting the cursor and the one or more items upward or downward and left or right depending upon the determined quadrant.

14. The apparatus of claim 9, wherein the memory and the computer program code are further configured to, with the processor, cause the apparatus to:

magnify the cursor and the one or more items displayed on the touch sensitive input device.

15. The apparatus of claim 9, wherein in order to shift the cursor and the one or more items displayed, the memory and the computer program code are further configured to, with the processor, cause the apparatus to shift the cursor and the one or more items at least one of downward or to one side, if the physical location of the tactile input is proximate a top edge of the touch sensitive input device, otherwise in order to shift the cursor and the one or more items displayed, the processor is further configured to shift the cursor and the one or more items upward.

16. The apparatus of claim 9, wherein a plurality of items are displayed on the touch sensitive input device, and wherein in order to shift the cursor and the one or more items displayed, the memory and the computer program code are further configured to, with the processor, cause the apparatus to shift the cursor and all of the plurality of items at least one of upward, downward, left or right.

17. A computer program product comprising at least one tangible computer-readable storage medium having computer-readable program code portions stored therein, the computer-readable program code portions comprising:

a first executable portion for receiving an indication of a tactile input from a user at a physical location on a touch sensitive input device;

a second executable portion for causing display of a cursor at a relative location on the touch sensitive input device proximate the physical location;

a third executable portion for shifting, without further user interaction, the cursor and one or more items displayed on the touch sensitive input device such that the relative location of the cursor is offset from the physical location of the detected tactile input; and a fourth executable portion for determining a distance between the one or more items displayed on the touch sensitive input device, wherein the cursor and the one or more items are shifted if at least one distance is less than a predetermined threshold.

18. The computer program product of claim 17, wherein the predetermined threshold comprises a predefined portion of the width of an average fingertip.

19. The computer program product of claim 17, wherein the computer-readable program portions further comprise:

a fifth executable portion for determining in which vertical half of the touch sensitive input device the physical location falls, wherein shifting the cursor and the one or more items displayed comprises shifting the cursor and the one or more items upward or downward depending upon the determined vertical half.

20. The computer program product of claim 17, wherein the computer-readable program portions further comprise:

a fifth executable portion for determining in which horizontal half of the touch sensitive input device the physical location falls, wherein shifting the cursor and the one or more items displayed comprises shifting the cursor and the one or more items left or right depending upon the determined horizontal half.

21. The computer program product of claim 17, wherein the computer-readable program portions further comprise:

a fifth executable portion for determining in which quadrant of the touch sensitive input device the physical location falls, wherein shifting the cursor and the one or more items displayed comprises shifting the cursor and the one or more items upward or downward and left or right depending upon the determined quadrant.

22. The computer program product of claim 17, wherein the computer-readable program code portions further comprise:

a fifth executable portion for magnifying the cursor and the one or more items displayed on the touch sensitive input device.

23. The computer program product of claim 17, wherein the third executable portion is configured to shift the cursor and the one or more items at least one of downward or to one side, if the physical location of the tactile input is proximate a top edge of the touch sensitive input device, otherwise the third executable portion is configured to shift the cursor and the one or more items upward.

24. The computer program product of claim 17, wherein a plurality of items are displayed on the touch sensitive input device, and wherein the third executable portion is configured to shift the cursor and all of the plurality of items at least one of upward, downward, left or right.

25. An apparatus comprising:

means for receiving an indication of a tactile input from a user at a physical location on a touch sensitive input device;

means for causing display of a cursor at a relative location on the touch sensitive input device proximate the physical location;

means for shifting, without further user interaction, the cursor and one or more items displayed on the touch sensitive input device such that the relative location of the cursor is offset from the physical location of the detected tactile input; and means for determining a distance between the one or more items displayed on the touch sensitive input device, wherein the cursor and the one or more items are translated shifted if at least one distance is less than a predetermined threshold.

26. The apparatus of claim 25, wherein the predetermined threshold comprises a predefined portion of the width of an average fingertip.

27. The apparatus of claim 25 further comprising:
means for determining in which half of the touch sensitive input device the physical location falls, wherein the means for shifting the cursor and the one or more items displayed comprises a means for shifting the cursor and the one or more items upward, downward, left or right depending upon the determined half.

28. The apparatus of claim 25 further comprising:
means for magnifying the cursor and the one or more items displayed on the touch sensitive input device.

29. The method of claim 1, wherein the one or more items comprise letters of a text document.

30. The method of claim 29, wherein causing display of the cursor further comprises causing display of the cursor between two letters.

31. The method of claim 1 further comprising:
receiving an indication of the removal of the tactile input; and returning the cursor and the one or more items displayed on the touch sensitive to the respective locations of the cursor and the one or more items prior to the shift.

32. The apparatus of claim 9, wherein the one or more items comprise letters of a text document.

33. The apparatus of claim 32, wherein causing display of the cursor further comprises causing display of the cursor between two letters.

34. The apparatus of claim 9, wherein the at least one memory and the computer program code are further configured to, with the at least one processor, cause the apparatus to:
receive an indication of the removal of the tactile input; and return the cursor and the one or more items displayed on the touch sensitive to the respective locations of the cursor and the one or more items prior to the shift.

* * * * *

UNITED STATES PATENT AND TRADEMARK OFFICE
CERTIFICATE OF CORRECTION

| | | |
|---|---|---|
| PATENT NO. | : 8,009,146 B2 | Page 1 of 1 |
| APPLICATION NO. | : 11/770283 | |
| DATED | : August 30, 2011 | |
| INVENTOR(S) | : Pihlaja | |

It is certified that error appears in the above-identified patent and that said Letters Patent is hereby corrected as shown below:

Column 13
Lines 18 and 19, "with the at least one processor" should read --with the processor--.

Column 15
Lines 11 and 12, cancel the word "translated".

Signed and Sealed this
Ninth Day of October, 2012

David J. Kappos
*Director of the United States Patent and Trademark Office*